(12) United States Patent
Young

(10) Patent No.: US 10,031,799 B1
(45) Date of Patent: Jul. 24, 2018

(54) AUDITOR FOR AUTOMATED TUNING OF IMPAIRMENT REMEDIATION

(71) Applicant: AMAZON TECHNOLOGIES, INC., Seattle, WA (US)

(72) Inventor: Lawrence Shao-Shien Young, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 189 days.

(21) Appl. No.: 14/867,856

(22) Filed: Sep. 28, 2015

(51) Int. Cl.
*G06F 11/07* (2006.01)
*H04L 12/803* (2013.01)

(52) U.S. Cl.
CPC ........ *G06F 11/0793* (2013.01); *G06F 11/079* (2013.01); *G06F 11/0712* (2013.01); *G06F 11/0751* (2013.01); *H04L 47/125* (2013.01)

(58) Field of Classification Search
CPC .......................... G06F 11/0793; G06F 11/079
See application file for complete search history.

(56) References Cited

U.S. PATENT DOCUMENTS

| | | | | |
|---|---|---|---|---|
| 8,527,814 B1* | 9/2013 | Elwell | ................. | G06F 11/0709 714/2 |
| 8,984,643 B1* | 3/2015 | Krisher | ............... | H04L 63/1433 726/25 |
| 2007/0168758 A1* | 7/2007 | Kolb | ..................... | G06F 9/4446 714/46 |
| 2008/0172574 A1* | 7/2008 | Fisher | .................... | G06Q 10/06 714/25 |
| 2008/0294423 A1* | 11/2008 | Castellani | ........... | G06F 11/0733 704/4 |
| 2010/0042560 A1* | 2/2010 | Vukovic | ................ | G06N 5/022 706/12 |
| 2010/0161389 A1* | 6/2010 | Arning | ..................... | G06N 5/04 705/7.11 |
| 2010/0333066 A1* | 12/2010 | Feniello | .............. | G06F 11/0748 717/120 |
| 2011/0055699 A1* | 3/2011 | Li | ..................... | G06F 17/30864 715/709 |
| 2011/0107137 A1* | 5/2011 | Lam | ..................... | G06F 11/0748 714/4.4 |
| 2012/0079098 A1* | 3/2012 | Moehler | ............. | G06F 11/0775 709/224 |
| 2012/0079314 A1* | 3/2012 | Kamath | .............. | G06F 11/0793 714/6.1 |

(Continued)

*Primary Examiner* — Yolanda L Wilson
(74) *Attorney, Agent, or Firm* — Blank Rome LLP

(57) ABSTRACT

A system for mitigating operational impairment of a computer system includes a plurality of computing nodes. Each of the computing nodes includes a processor and memory coupled to the processor. The computing nodes are configured to: implement a plurality of computing devices; identify an impairment in operation of a first of the computing devices; execute a first remediation operation to mitigate the impairment; analyze operation of the first of the computing devices after execution of the first remediation operation to determine whether the first remediation operation is effective to mitigate the impairment; and change a frequency with which the first remediation operation is applied to mitigate the impairment based on whether the first remediation operation is deemed effective to mitigate the impairment.

18 Claims, 8 Drawing Sheets

(56) References Cited

U.S. PATENT DOCUMENTS

| | | | | |
|---|---|---|---|---|
| 2012/0331340 A1* | 12/2012 | Birkler | ............... | G06F 11/0703 |
| | | | | 714/15 |
| 2014/0006844 A1* | 1/2014 | Alderman | ........... | G06F 11/0793 |
| | | | | 714/4.1 |
| 2014/0068330 A1* | 3/2014 | Hecox | ............... | G06F 11/0706 |
| | | | | 714/26 |
| 2014/0082417 A1* | 3/2014 | Barton | ................. | G06F 11/079 |
| | | | | 714/26 |
| 2015/0052122 A1* | 2/2015 | Landry | .............. | G06F 11/0706 |
| | | | | 707/723 |
| 2015/0370619 A1* | 12/2015 | Nagura | .................. | G06F 9/542 |
| | | | | 719/318 |

\* cited by examiner

AUDITOR FOR AUTOMATED TUNING OF IMPAIRMENT REMEDIATION

BACKGROUND

As an increasing number of applications and services are being made available over networks such as the Internet, an increasing number of service providers are turning to technologies such as cloud computing. In general, cloud computing is an approach to providing access to remote resources through a network. Such resources may include hardware and/or software. Hardware resources may include computers (e.g., servers), mass storage devices, and other useful hardware elements. Software resources may include operating systems, databases, etc. Customers of the service provider can create and manage virtual machines using the service provider's resources and load customer-specific software applications on such virtual machines. The customer then may purchase use of the service provider's resources rather than subjecting itself to the demands of owning and operating hardware and software resources.

Operation of the virtual machines employed by a customer may be impaired for a variety of reasons. For example, faults in hardware or software underlying a virtual machine, faults in the customer's software running on a virtual machine, misconfiguration, or other factors may result in apparent impairment of virtual machine operation.

BRIEF DESCRIPTION OF THE DRAWINGS

For a detailed description of various examples, reference will now be made to the accompanying drawings in which.

DETAILED DESCRIPTION

Figure 1:
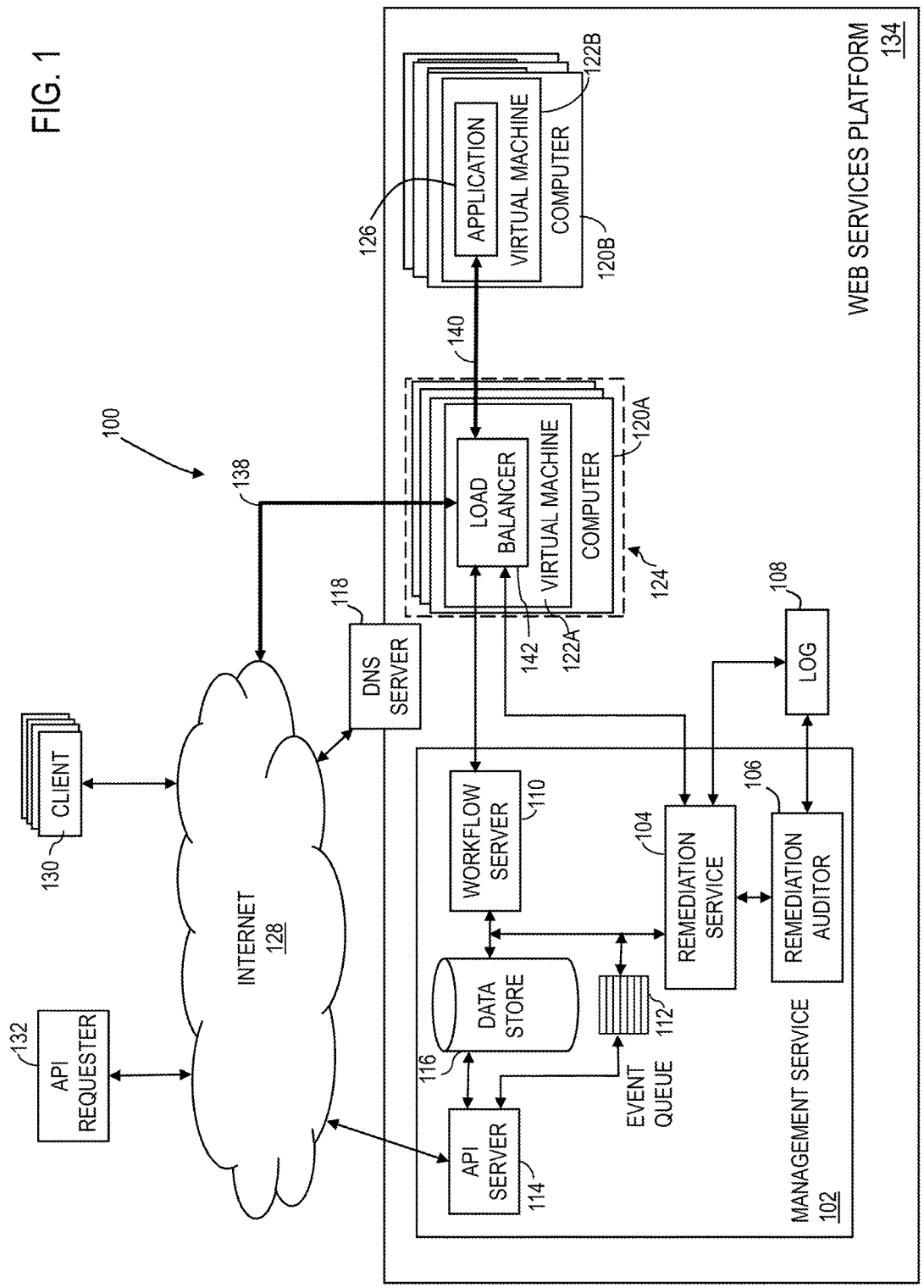
FIG. 1 shows a schematic diagram of a system architecture that provides auditing and tuning of impairment remediation in accordance with various examples.

The present disclosure is directed to technologies for improving quality of service in a web-based computing system. Embodiments of the present disclosure improve quality of service by controlling remediation of impaired devices in the computing system. More specifically, embodiments of a remediation auditor disclosed herein analyze the results of remediation operations performed on virtual devices in the computing system to determine whether a particular remediation operation is effective to mitigate or correct an impairment in operation of virtual devices of the computing system. The remediation auditor applies the results of the analysis to tune operation of a remediation service that identifies impairments in operation of virtual devices of the computing device and attempts to correct the impairments.

A web-based computing system, such as a service provider environment, may provide computing resources that support the computing needs of thousands of customers. Each customer may apply a large number of virtual machines and services offered by an operator of the web-based computing system to implement an application. The services may in turn use virtual machines may implement a variety of components (e.g., load balancers, databases, address translators, web servers, etc.) that cooperate to provide the services requested by a customer. Impairment of a component can cause elevated error rates, timeouts, increased latencies, or other operational anomalies that reduce quality of service. The web services platform disclosed herein includes an automated remediation service that monitors the operation of the various components and the virtual machines that implement them. The monitoring may include analysis of metrics related to the operation of the components and performance of the virtual machines. When an impairment in operation is identified, the remediation service attempts to correct the impairment. For example, the remediation service may replace an impaired virtual machine with another virtual machine of the same or a different type.

Because not all impairments in operation of a component are caused by the underlying virtual machine, in some cases the actions taken by the remediation service may not mitigate or correct the identified impairment. For example, if an impairment in operation of a web server is caused by a fault in a customer's application, then replacing a virtual machine underlying the web server will not mitigate or correct the impairment in web server operation. In order to ascertain the effectiveness of remediation operations provided by the remediation service, the web services platform includes a remediation auditor. The remediation auditor analyzes the performance of components of the web-based computing system that have been identified as impaired and been subject to a remediation operation in an attempt to correct the impairment. Based on the analysis of component performance, the remediation auditor determines whether a remediation operation has successfully mitigated or corrected a problem that caused an impairment, and adjusts or tunes the operation of the remediation service with respect to the impairment. For example, if analysis of post-remediation performance of a component indicates that an applied remediation operation successfully mitigated or corrected an impairment, then the remediation auditor may determine that the impairment was caused by a specific problem and tune the remediation service to apply that particular remediation operation more frequently (e.g., to correct an identified impairment). Similarly, if analysis of post-remediation performance of a component indicates that an applied remediation operation failed to mitigate or correct an impairment, then the remediation auditor may determine that no problem existed or that the system incorrectly diagnosed the problem and tune the remediation service to apply the remediation operation less frequently or to apply a different remediation operation to attempt correction of the impairment when identified in other instances of the component. The remediation auditor can also analyze performance data of impaired components gathered over time to identify underlying causes of an impairment. For example, if a relatively high percentage of a particular component (e.g., a load balancer) that is implemented using a first type of virtual machine is found to have been impaired, while a lower percentage of the component implemented using a second type of virtual machine is impaired, then the remediation auditor may conclude that the first type of virtual machine may include a fault that causes the impairment and notify appropriate support authorities of the potential fault in the first virtual machine.

The remediation auditor can also identify potential faults in systems underlying the virtual machines as a source of impairment. For example, the remediation auditor can correlate the timing of errors or loading increases in the microprocessors running the virtual machines, increases in traffic to be processed, and other system events with metrics indicating component impairment. If the timing analysis indicates that a fault in an underlying component may be the cause of an identified impairment, then the remediation auditor can notify appropriate support authorities. Similarly, if particular system events correspond to an apparent change in the rate of errors or rate of impairment present in a component, then the remediation auditor can notify appropriate support authorities of the relationship between the event and the incidence of errors or impairment in the component. For example, if after the introduction of updated virtual machine software, the rate of impairment of a particular component increases, then the remediation auditor may notify appropriate support authorities of the apparent correspondence between the updated virtual machine software and the rate of component impairment.

While embodiments are described herein with reference to virtual machines, the remediation and remediation auditing operations disclosed are applicable to a variety of physical and virtual computing devices and systems. For example, some embodiments may implement containers rather than or in addition to virtual machines, and the remediation operations disclosed herein applied to the containers and underlying systems and components.

FIG. 1 shows a schematic diagram of a system architecture 100 that provides auditing and tuning of impairment remediation in accordance with various examples. The system architecture 100 includes a web services platform 134 that communicates with an application programming interface (API) requestor 132 and one or more clients 130 via the Internet 128. The web services platform 134 is a web-based computing system. The API requestor 132 is a management entity that provides control information to the web services platform 134, and receives status information from the web services platform 134. The API requestor 132 may be a management console presented in a web browser executed by a computer, a command line interface executed by a computer, an automated management system or script executed by a computer, etc. A customer (e.g., a business entity) of a web services provider may utilize the API requestor to receive status information from the web services platform 134 and to provide control information to the web services platform 134.

The clients 130 are computing devices that request services from an application executed by the web services platform 134. A computing device suitable for use as an API requestor 132 or client 130 may be a desktop computer, a laptop computer, a tablet computer, a smartphone, or other computing device.

The domain name service (DNS) server 118 stores DNS records that may include network addresses (e.g., internet protocol (IP) addresses) of servers that correspond to domain names. For example, DNS server 118 may receive hypertext transfer protocol (HTTP) requests from clients 130 for IP addresses via which services provided by the web services platform 134 may be accessed. On receipt of such a request, the DNS server 118 may perform a look-up function and return IP addresses to the clients 130.

The web services platform 134 includes a plurality of computers 120, illustrated as computers 120A, 120B, etc., arranged to provide services, for example, services provided by the application 126, to the clients 130. The web services platform 134 may execute multiple instances of the application 126 to provide a desired quality of service to the clients 130. In an example embodiment, the web services platform 134 executes each instance of the application 126 in a virtual machine 122B or a container (not illustrated). Each virtual machine 122B is executed by a computer 120B. As each additional instance of the application 126 is created, the web services platform 134 allocates a computer 120B to the application, creates an instance of the virtual machine 122B on the computer 120B, and executes the instance of the application 126 on the virtual machine 122B. By varying the number of instances of application 126 executing on a virtual machine 122B, the web services platform 134 scales the computing resources dedicated to the application 126 as needed to provide a desired quality of service.

To control routing of requests 138 received from the clients 130 to the instances of the application 126, as requests 140, the web services platform 134 instantiates a virtual load balancer 124. The virtual load balancer 124 is implemented in one or more virtual machines 122A by one or more computers 120A. Each of the virtual machines 122A implements a load balancer node 142 that routes requests 138 to at least some of the instances of the application 126. The web services platform 134 scales load balancer 124 by increasing or decreasing the number of virtual machines 122A executing nodes 142 of the load balancer 124. As the number of virtual machines 122A changes, the amount of computing resources applied to execute the load balancer 124 also changes. The load balancer 124 may distribute request traffic to the applications 126 by random selection, round robin distribution, or may implement one or more algorithms to distribute traffic. For example, for routing requests, the load balancer 124 may take into account factors, such as an application's reported load, recent response times, number of active connections, geographic location, number of requests an application has recently been assigned, etc.

The web services platform 134 includes a management service 102 that controls operation and scaling of the load balancer 124. The management service 102 includes an API server 114, a data store 116, an event queue 112, a workflow server 110, and a load balancer monitor 104. The API server 114 receives requests from the API requester 132 and configures the management service 102 to execute the requests. For example, the API server 144 may receive a request to create a load balancer 124, modify the load balancer 124, configure the load balancer 124, etc. On receipt of a request from the API requester 132, the API server 114 may store parameters received as part of the request in the data store 116. The data store 116 provides persistent storage for parameters of the load balancer 124 and can be implemented using a database or database service or a block or object store. Parameters received as part of a request may include parameters for configuring the load balancer 124, a request identifier, an identifier for the customer and parameters specific for the load balancer 124. For example, the parameters may include an amount of computing resources to reserve for use by the load balancer 124. The API server 114 may also store an event flag in the event queue 112 to indicate that an operation is to be performed with respect to the load balancer 124. The event queue 112 stores flags that trigger the workflow server 110 to perform an operation.

The workflow server 110 manages the load balancer 124 based on the information stored in the data store 116. For example, the workflow server 110 may create a virtual machine 122A and an instance of the load balancer 124 as needed to route requests received from the clients 130, modify existing instances of the load balancer 124, etc. based on the information stored in the data store 116. In a specific example, this can include configuring the workflow server 110 with executable code that causes it to access the data store 116 and/or the event queue 112 to check for new requests. The workflow server 110 monitors the event queue 112 for flags indicating that an operation affecting the load balancer 124 is to be performed. If the workflow server 110 reads an event flag from the event queue 112, the workflow server 110 may perform operations to configure the load balancer 124 as indicated by the parameters stored in the data store 116. For example, in response to reading an event flag from the event queue 112, the workflow server 110 may reserve and assign an amount of computing resources for use by the load balancer 124.

In order to maintain quality of service by the load balancer 124, the management service 102 includes remediation service 104 and remediation auditor 106. The remediation service 104, remediation auditor 106, and other devices and components described herein are implemented by computer hardware, including processors, memory, and other circuitry, as further described with reference to FIG. 8. While the remediation service 104 and remediation auditor 106 are described herein with respect to maintaining the quality of service of the load balancer 124, the remediation service 104 and remediation auditor 106 and the operations performed thereby are not limited to the load balancer 124, but are applicable to a variety of components implemented in the web services platform 134. For example, embodiments of the remediation service 104 and the remediation auditor 106 may be included in a management service applied to a web server, a network address translator, a database, or any other device or component implemented by the web services platform 134.

The remediation service 104 monitors the operation of the load balancer 124 to determine whether operation of one or more of the load balancer nodes 142 or virtual machines 122A of the load balancer 124 has become impaired or anomalous. The remediation service 104 may identify impaired operation of the load balancer 124 by analyzing metrics of operation collected from the virtual machines 122A, the load balancer nodes 142 executed by the virtual machines 122A, the network traffic passing through the load balancer, or other sources. For example, each instance of a load balancer node 142 executing on a virtual machine 122A, or an agent monitoring operation of the load balancer 124, may generate status information, or metrics, that represent the state of operation of the load balancer 124 at a given time and/or the state of the network traffic to or from the application 126. Such metrics may include error codes, measurements of latency (e.g., packet latency) in the load balancer 124, measurements of computing resource utilization (e.g., memory utilization, processor cycle utilization, secondary storage utilization, network utilization), measurements of number of connections established by the load balancer 124, measurements of network traffic (e.g., rates of traffic, number of packets and/or bytes transferred) processed by the load balancer 124, and/or measurements of a number of dropped packets by the load balancer 124.

The remediation service 104 may analyze the collected metrics by comparing the metrics, or selected ones of the metrics, for each the load balancer nodes 142 or virtual machine 122A to a standard selected to identify impaired operation. For example, such a standard may specify that a load balancer node 142 recording more than a threshold number of error codes within a monitoring interval (e.g., a minute, an hour, etc.) is operationally impaired. Embodiments of the remediation service may generate the standard in a variety of ways. In some embodiments, the standard may be based on an average error rate, or other metrics, of the load balancer nodes 142 used to implement a number of load balancers 124. In other embodiments, the standard applied to a given the load balancer nodes 142 may be based on an average error rate, or other metrics, of the load balancer nodes 142 used to implement a load balancer 124. In some embodiments, the standard may be based on a previously recorded value of error rate, or other metrics, of a particular instance of the load balancer node 142. For example, if the error rate, or other metric(s) generated by a given instance of the load balancer node 142 differs from the standard (e.g., an average error rate for the load balancer nodes 142) by more than a predetermined amount (e.g., a predetermined number of standard deviations), then the remediation service 104 may identify the given instance of the load balancer node 142 as impaired.

The remediation service 104 stores the various metrics collected for the load balancer 124 in log 108. The log 108 may store metrics generated over time for operation of any number of devices implemented by the web services platform 134. For example, the log 108 may store metrics for operation of each load balancer node 142 and virtual machine 122A over a period of weeks or months, such that metrics generated prior to and after remediation operations are applied to a given instance of the load balancer nodes 142 or virtual machine 122A are stored in the log 108.

If the remediation service 104 identifies load balancer nodes 142 or a virtual machine 122A as impaired, then the remediation service 104 may apply a remediation operation to attempt to correct the impairment. Examples of remediation operations that the remediation service 104 may apply to attempt to correct an impairment include gracefully shutting down an impaired load balancer node 142, and replacing the impaired load balancer node 142 with a replacement instance of the impaired load balancer node 142 using a replacement instance of the virtual machine 122A, where the replacement instance of the virtual machine 122A may be the same type of virtual machine as the virtual machine being replaced or a different type of virtual machine (e.g., a larger virtual machine) than the virtual machine being replaced. The remediation service 104 may also perform a remediation operation that adds load balancer nodes 142 to the virtual load balancer 124. The virtual machines 122A underlying the added load balancer nodes 142 may be of a same type as virtual machines 122A already operating in the virtual load balancer 124, or may be of a different type than virtual machines 122A already operating in the virtual load balancer 124. For example, the web services platform 134 may be capable of providing virtual machines of various types, where the different types may provide different amounts of computing resources or different computing capabilities. A first type of virtual machine implemented by the web services platform 134 may provide a given amount of memory and a given amount of processing capacity, and a second type of virtual machine implemented by the web services platform 134 may provide twice the amount of memory and twice the amount of processing capacity as the first type of virtual machine. In some embodiments, the first type of virtual machine may execute on computing hardware meeting particular specifications, while the second type of virtual machine may execute on computing hardware that meets different specifications.

Because the cause of an impairment may be complex (or there may not be a problem with the load balancer nodes 142 or virtual machines 122A, but in the network, the application, etc.), the remediation operation performed by the remediation service 104 may or may not be successful in mitigating or correcting the impairment. The remediation auditor 106 examines the effects of remediation operations performed by the remediation service 104 to determine whether the remediation operations performed are effective to mitigate or correct the targeted impairments. The remediation auditor 106 tunes or adjusts the remediation service 104 based on results of analysis of the effectiveness of remediation operations. By tuning the operation of the remediation service 104, the remediation auditor 106 improves the effectiveness of remediation and improves overall quality of service provided by the web services platform 134. The remediation auditor 106 automatically performs the operations described herein as a background process, and without user involvement.

After a remediation operation has been performed by the remediation service 104, the remediation auditor 106 analyzes the metrics relevant to the operation of the remediated load balancer node 142 and virtual machine 122A (e.g., the replacement virtual machine 122A). If analysis of the metrics indicates that the performance of the load balancer node 142 or virtual machine 122A has improved as a result of the remediation operation, the remediation auditor 106 may deem the remediation operation effective, and tune the remediation service 104 to perform the remediation operation more frequently or aggressively over other potential remediation operations. For example, the remediation auditor 106 may cause the remediation service 104 to lower a threshold value that dictates when a load balancer nodes 142 or virtual machine 122A is considered to be impaired, thereby increasing the frequency with which the remediation operation is applied. By lowering the threshold, the remediation auditor 106 may reduce the incidence of load balancer nodes 142 or virtual machines 122A behaving anomalously that are deemed unimpaired (i.e., reduce the incidence of false negatives). The remediation auditor 106 may also tune the remediation service 104 to weight or prioritize the remediation operation such that the remediation operation is favored with respect to alternate remediation options, thereby increasing the frequency with which the remediation operation is applied.

On the other hand, if analysis of the metrics indicates that the remediation operation failed to improve the performance of the load balancer node 142 or the virtual machine 122A, then the remediation auditor 106 may deem the remediation operation ineffective, and tune the remediation service 104 to perform the remediation operation less frequently, and/or may cause the remediation service 104 to perform a different remediation operation to correct the impairment. For example, if the remediation service 104 replaced an impaired virtual machine 122A with a different instance of the same type of virtual machine, and the remediation auditor 106 determines that the replacement with the same type of virtual machine failed to mitigate or correct the impairment, then the remediation auditor may tune the remediation service 104 to perform a different remediation operation to correct the same impairment in other virtual machines 122A, e.g., replace the impaired virtual machine 122A with a different type of virtual machine. Similarly, if the remediation operation is deemed to be ineffective, then the remediation auditor 106 may cause the remediation service 104 to increase a threshold value that dictates when a virtual machine 122A is considered to be impaired, thereby decreasing the frequency with which the remediation operation is applied. By raising the threshold, the remediation auditor 106 may reduce the incidence of load balancer nodes 142 or virtual machines 122A wrongly deemed impaired (i.e., reduce the incidence of false positives).

In some embodiments, the remediation auditor 106 may apply a threshold value that dictates whether a remediation operation is to be performed if a device is deemed impaired, rather than a threshold that dictates whether a device is deemed to be impaired. Accordingly, the remediation auditor 106 may, based on remediation operations being deemed effective, lower the threshold value that dictates whether a remediation operation is to be performed if a device is deemed impaired, thereby increasing the frequency of remediation. Similarly, the remediation auditor 106 may, based on remediation operations being deemed ineffective, raise the threshold value that dictates whether a remediation operation is to be performed, thereby decreasing the frequency of remediation. Some embodiments of the remediation auditor 106 may apply a first threshold value that dictates whether a device is considered impaired, and a second threshold value that dictates whether a remediation operation is performed on an impaired device.

The analysis of metrics employed by the remediation auditor 106 to determine whether a remediation operation is effective may be similar to that employed by the remediation service to determine whether a load balancer node 142 or virtual machine 122A is impaired. The remediation auditor 106 may analyze post-remediation performance by comparing metrics for a load balancer node 142 or virtual machine 122A generated post-remediation, or selected ones of the post-remediation metrics, to a standard selected to identify mitigation or correction of an impairment. For example, such a standard may specify that impairment has been mitigated or corrected if a load balancer node 142 or virtual machine 122A records fewer than a threshold number of error codes within a monitoring interval (e.g., a minute, an hour, etc.). Embodiments of the remediation service may produce the threshold in a variety of ways. In some embodiments, the threshold may be based on a number of error codes produced by an unimpaired load balancer node 142 or virtual machine 122A within a monitoring interval prior to the remediation operation. In other embodiments, the threshold may be based on a number of error codes produced by an unimpaired load balancer node 142 or virtual machine 122A within a monitoring interval subsequent to the remediation operation. The remediation auditor 106 may select the pre- and post-remediation monitoring intervals such that loading or the workload of the load balancer node 142 or virtual machine 122A is similar during the pre- and post-remediation monitoring intervals. In yet other embodiments, the threshold may be based on an average number of error codes recorded by impaired load balancer nodes 142 or virtual machines 122A over time.

In some embodiments, the threshold may be based on an average error rate, or other metrics, of the load balancer nodes 142 or virtual machines 122A used to implement the virtual load balancer 124. In other embodiments, the threshold applied to judge the success of remediation may be based on an average error rate, or other metrics, of the load balancer nodes 142 or virtual machines 122A used to implement the load balancer 124 that includes the remediated load balancer node 142. The average error rates may be established based on pre-remediation or post-remediation metrics. For example, if the error rate, or other metric(s) generated by a remediated load balancer node 142 or virtual machine 122A, differs from the average post-remediation error rate for other instances of the load balancer nodes 142 or virtual machines 122A by less than a predetermined amount (e.g., a predetermined number of standard deviations (1σ, 1.5σ, 2σ, etc.), then the remediation auditor 104 may deem the remediation operation successful.

The remediation auditor 106 may retrieve the metrics used to assess the effectiveness of a remediation operation from the log 108. As noted above, the log 108 may store metrics for the load balancer 124, the load balancer nodes 142, virtual machines 122A, computers 120A, and various other virtual and physical components of the web services platform 134 collected over any time period (weeks, months, or years) relevant to improving the quality of service of the web services platform 134. The metrics stored in the log 108 may be collected by the remediation service 104 or other monitoring systems of the web services platform 134.

The remediation auditor 106 may analyze the metrics stored in the log 108 to isolate a source of an impairment identified in the virtual machines 122. For example, if analysis of the metrics stored in the log 108 shows that a relatively high percentage of the virtual machines 122A found to have been impaired are of a particular type, then the remediation auditor 106 may conclude that that particular type of virtual machine has a fault that produces the impairment. The remediation auditor 106 may tune the remediation service 104 to reduce or eliminate the use of the particular virtual machine, and notify appropriate support authorities of the potential fault in the virtual machine.

The remediation auditor can also analyze performance data gathered over time for impaired components to identify the underlying causes of an impairment. That is, the remediation auditor 106 can identify potential faults in virtual and hardware systems underlying the virtual machines as a source of impairment. For example, metrics generated for hardware components, such as processors and memory systems are stored in the log 108, and the remediation auditor 106 can compare time-stamps or other time values recorded in conjunction with metric or event information to correlate the timing of errors, loading increases, or other metrics for a processor or other component underlying a virtual machine 122A with metrics indicating impairment of the load balancer node 142 or the virtual machine 122A. If the timing analysis indicates that a fault (e.g., a reported error) in an underlying component or system, a particular revision of a component or system, a particular configuration of components and/or systems, etc. may be the cause of an impairment in the load balancer node 142 or the virtual machine 122A, then the remediation auditor 106 can notify appropriate support authorities.

Similarly, the log 108 may include records of various system events, such as timing of software updates for virtual components, or for software underlying virtual components, device configuration changes, etc. If timing of a particular system event recorded in the log 108 corresponds to an apparent change in the rate of impairment of the load balancer nodes 142 or virtual machines 122A, then the remediation auditor 106 can notify appropriate support authorities of the relationship between the event and the incidence of component impairment. For example, if after the introduction of updated software for a particular type of virtual machine, the rate of impairment for the virtual machine increases, then the remediation auditor may notify appropriate support authorities of the apparent correspondence between the updated virtual machine software and the rate of component impairment.

Figure 2:
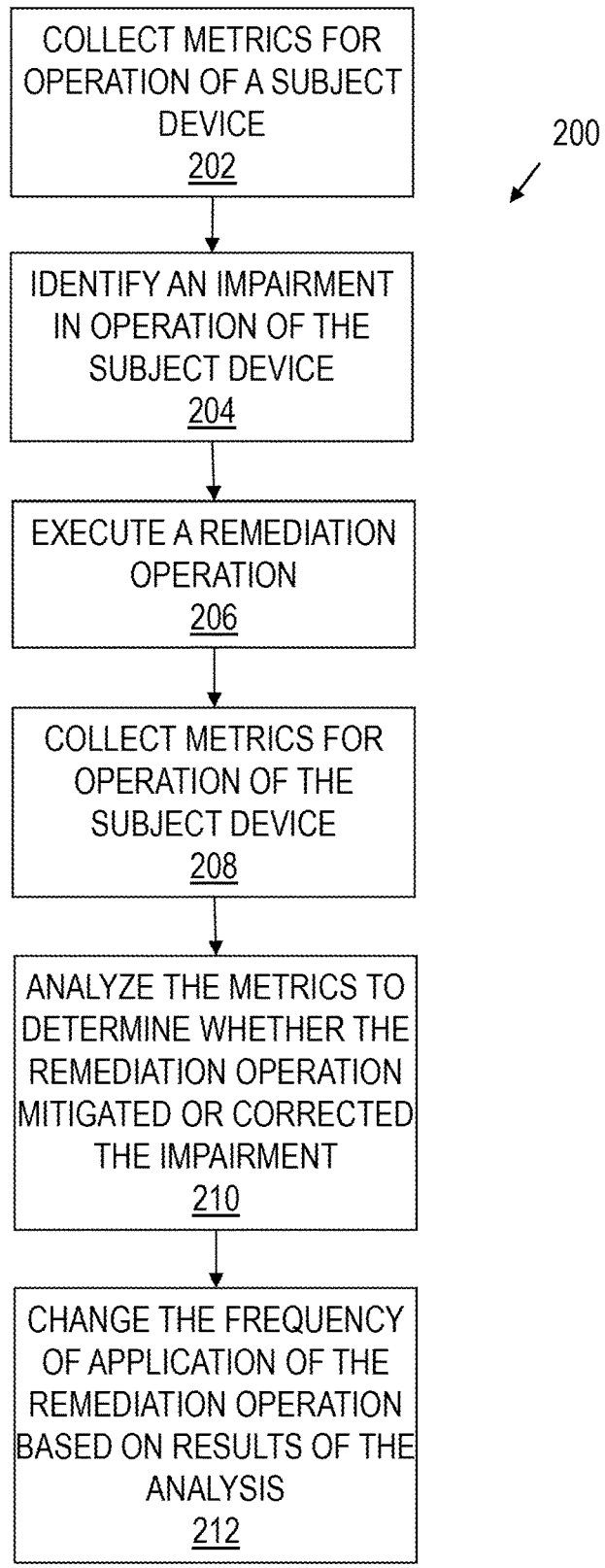
FIG. 2 shows a flow diagram for a method for auditing and tuning remediation in accordance with various examples.

FIG. 2 shows a flow diagram for a method 200 for auditing and tuning remediation in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 200 may be provided by instructions executed by a computer of the web service platform 134.

In block 202, the remediation service 104 collects metrics for operation of an instance of a device of the web services platform 134. The device may be a distributed networking device, such as a load balancer 124, that included one or more load balancer nodes 142 executing on one or more virtual machines 122A, for example. The metrics may include status information such as error codes, latency measurements associated with network traffic that traverses the networking device, computing resource utilization measurements for the one or more virtual machines that effectuate the distributed networking device, connections established, network traffic measurements, retransmits of network packets, dropped packets, and other metrics that may reflect the operational state of the nodes that make up the distributed networking device. The metrics may be continually or periodically collected and stored in the log 108. The networking device itself may collect the metrics and store the metrics in the log 108, or an agent monitoring the device may collect the metrics and store the metrics in the log 108.

The collected metrics stored in the log 108 may be processed, by the remediation service 104, to extract additional metrics. For example, the number of errors recorded/reported by a device over any number of time intervals may be averaged to generate an average (e.g., arithmetic mean) error rate for the device over the time intervals. Similarly, a number of errors or error rate for each of a number of devices may be averaged to generate an average (e.g., arithmetic mean) number of errors or error rate for the devices.

In some embodiments, the web services platform 134 may measure loading of the computing devices and systems and store the loading information in the log 108. For example, a load balancer node 142, or an agent associated with the load balancer node 142 or, may periodically monitor loading due to service requests 138 handled by the load balancer node 142 or and store the measurements, along with time stamps or other time signatures in the log 108. The remediation service 104 may apply the loading measurements to track the effectiveness of remediation operations with respect to device loading. For example, remediation effectiveness above a loading threshold may be tracked separately from remediation effectiveness below the loading threshold.

In some embodiments, the web services platform 134 may monitor the content of the service requests 138 received from a client 130, and corresponding responses from the application 126 to ascertain the workload of each of the load balancer nodes 142, and store information identifying the content in the log 108. For example, the web service platform 126 may store statistical information related to the source of service requests 138, content requested from the application 126, protocols applied in the requests 128, etc.

Such information may periodically be generated and stored in the log 108, such that characteristics of service requests 138 processed by each load balancer node 142 during a time interval can be determined, and applied to identify a correspondence between error rates in the load balancer nodes 142 and the content of the service request 138. In such embodiments, the remediation auditor 106 may apply the workload information to track the effectiveness of remediation operations with respect to device workload. For example, given a first workload a first remediation operation may be ineffective, and a second remediation operation may be effective, while given a second workload the first remediation operation may be effective. Having determined the effectiveness a remediation operation with respect to workload, the remediation auditor 106 may select a remediation operation to be performed in accordance with the workload presented to an impaired load balancer node 142.

In block 204, the remediation service 104 processes the collected metrics to identify potential impairments in the operation of the networking device. The remediation service 104 may determine whether the instance of the device is impaired by comparing the metrics for the instance of the device to previously collected metrics for the instance of the device or metrics for other instances of the device. For example, if the number of errors or error rate recorded for the instance of the device over a predetermined time period exceeds an average number of errors or error rate recorded for other instances of the device in the same time period by a selected amount, then the remediation service 104 may deem the instance of the device to be impaired. Alternatively, if the number of errors or error rate recorded for the instance of the device over a predetermined time period exceeds the number of errors or error rate recorded for the instance of the device over a similar, but earlier, time period by a selected amount, then the remediation service 104 may deem the instance of the device to be impaired.

In block 206, the remediation service 104 executes a remediation operation to correct the identified impairment. The particular remediation operation executed may be selected based on the relative effectiveness, as determined by the remediation auditor 106, of any number of remediation operations previously performed to correct the same or similar impairment in devices that are the same or similar to the impaired instance of the device. For example, in some embodiments, the available remediation operations may be prioritized based on past effectiveness, and a highest priority, e.g., a most effective, of the remediation operations selected. In some embodiments, particular remediation operations may be selected based on the conditions under which the impaired device is operating. For example, different remediation operations may be selected based on the workload of the device. That is, for a first workload, e.g., a workload dominated by service requests 138 of a first type, a first remediation operation may be selected for performance, while for a second workload, e.g., a workload dominated by service requests 138 of a second type, a second remediation operation, different from the first remediation operation, may be selected for performance. Similarly, different remediation operations may be selected based on how much of the processing capacity of the impaired instance of the device is being used to process the service requests 138 received from the client 130. For example, a higher degree of loading may suggest selection of a larger virtual machine 122A.

In some embodiments, the remediation operation may include halting the impaired instance of the device and replacing the halted instance of the device with a new instance of the device. For example, if the impaired device is a virtual machine 122A, then connections to the software running on the impaired virtual machine may be broken, the software running on the impaired virtual machine may be halted, execution context stored, and the impaired virtual machine halted and deallocated. The replacement virtual machine may be started, component software loaded onto the virtual machine, and connections to the software restored, execution context restored, and execution initiated thereby allowing the replacement virtual machine to operate in place of the impaired virtual machine. The new instance of the device may be of the same type as the halted instance or of a different type than the halted instance. As explained above, the web services platform 134 may support virtual machines that differ with respect to the amount computing resources (e.g., processors, memory, network access privileges, etc.) or other capabilities provided in connection with the virtual machine. Thus, the web services platform 134 may support different types of virtual machines 122A, and a new instance of a device (e.g., a load balancer node 142) may execute on a virtual machine 122A that is of a different type (e.g., provides more computing resources or capabilities) than the replaced device.

In block 208, the remediation service 104 collects metrics for operation of the new instance of the device. The metrics collected may be substantially the same as those collected and applied to identify the impaired instance of the device.

In block 210, the remediation auditor 106 analyzes the metrics collected post-remediation to determine whether the remediation operation performed by the remediation service 104 mitigated or corrected the identified impairment. Additional details of the post-remediation analysis are presented in FIGS. 3 and 4. In some embodiments, determining whether the remediation operations performed by the remediation service 104 are effective to mitigate the identified impairment may include concluding that the impairment is not due a fault in the impaired device or a virtual machine 122A or a component or system underlying impaired device, but rather due to a customer application, configuration, or workflow. For example, an application or system provided or configured by a customer of the service provider, and executed by the web services platform 134 (e.g., application 126), may be deemed the cause of the impairment if the remediation operation is ineffective.

In block 212, the remediation auditor 106 tunes the operation of the remediation service 104 based on results of the analysis performed in block 210. In some embodiments, if the analysis determines that the identified impairment is caused by or located in the virtual machine 122A or a component underlying the virtual machine 122A, then the remediation auditor 106 may cause the remediation service 104 to execute the remediation operation more frequently to correct the impairment and/or to detect the impairment more frequently and thereafter apply the remediation operation. Conversely, if virtual machine 122A or a component underlying the virtual machine 122A is determined not to be the cause of the impairment, then the remediation auditor 106 may cause the remediation service 104 to execute the remediation operation less frequently to correct the impairment and/or to detect the impairment less frequently and thereafter apply the remediation operation.

In some embodiments, the remediation auditor 106 tunes the operation of the remediation service 104 based on the determined effectiveness of the remediation operation performed by the remediation service 104. If the remediation operation is determined to be effective to mitigate or correct the impairment, then the remediation auditor 106 may cause the remediation service 104 to execute the remediation operation more frequently to correct the impairment and/or to detect the impairment more frequently and thereafter apply the remediation operation. Conversely, if the remediation operation is determined to be ineffective, then the remediation auditor 106 may cause the remediation service 104 to execute the remediation operation less frequently to correct the impairment and/or to detect the impairment less frequently and thereafter apply the remediation operation.

Figure 5:
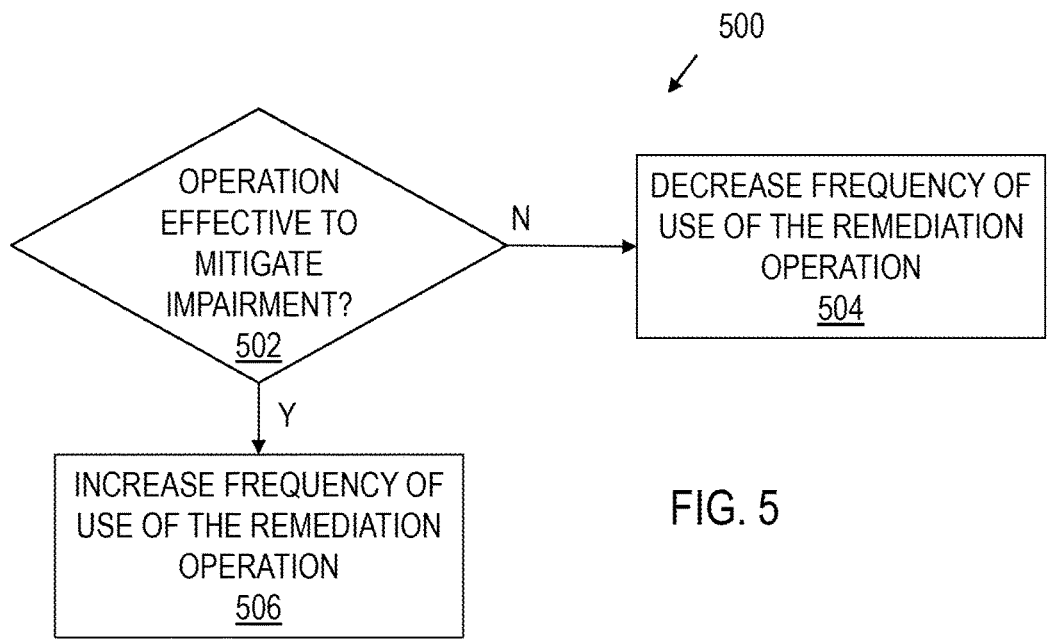
FIG. 5 shows a flow diagram for a method for tuning a remediation in accordance with various examples.
Figure 6:
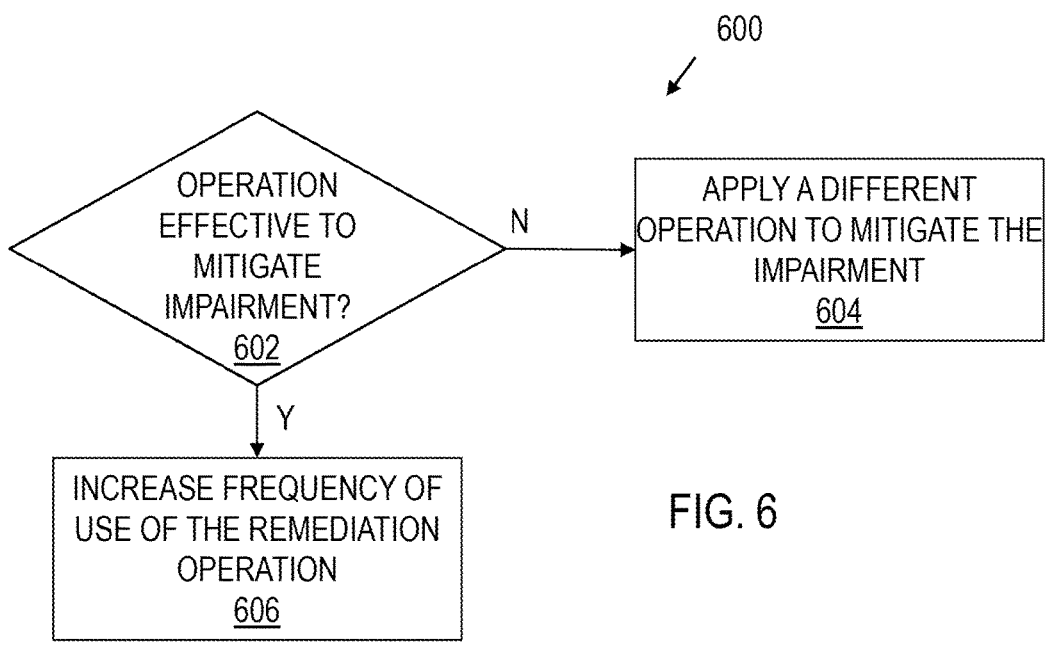
FIG. 6 shows a flow diagram for a method for tuning a remediation in accordance with various examples.
Figure 7:
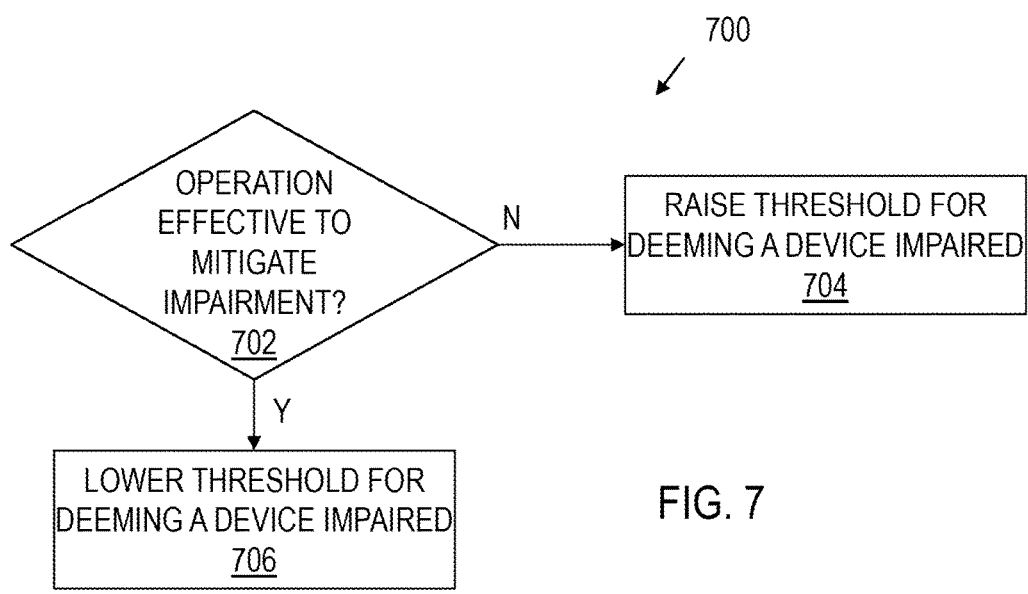
FIG. 7 shows a flow diagram for a method for tuning a remediation in accordance with various examples.

Additional details of remediation service 104 tuning are presented with reference to FIGS. 5-7. Tuning the operation of the remediation service 104 may include communication between the remediation auditor 106 and the remediation service 104, where the communication contains parameter information that changes how the remediation service 104 performs remediation operations.

Figure 3:
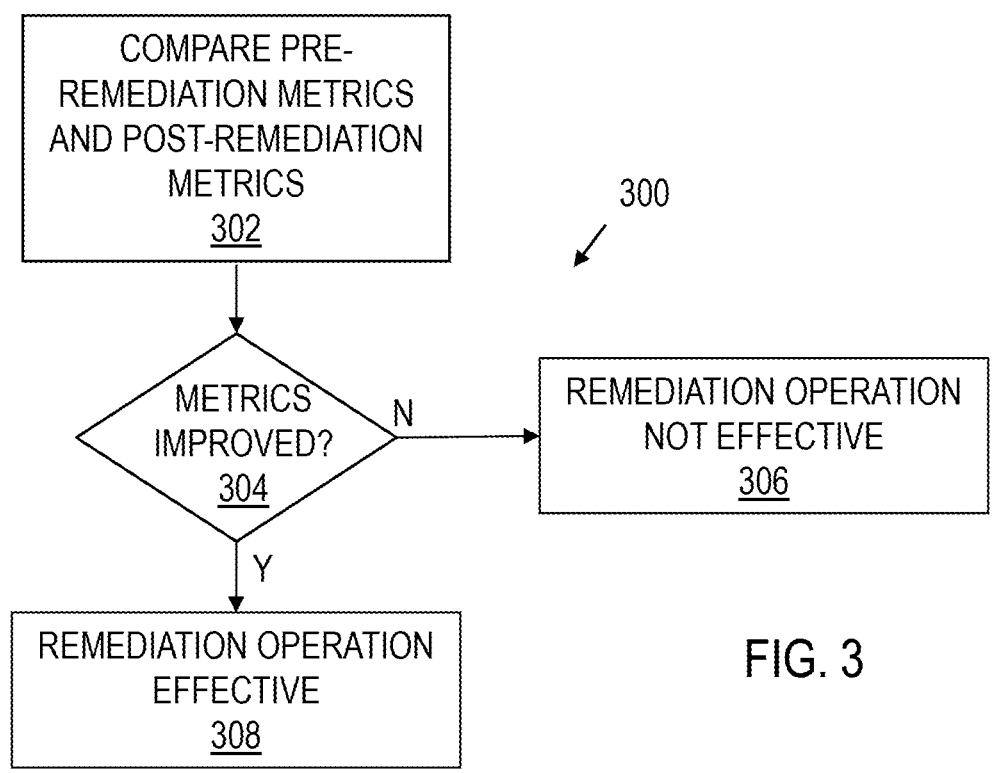
FIG. 3 shows a flow diagram for a method for evaluating effectiveness of a remediation operation in accordance with various examples.

FIG. 3 shows a flow diagram for a method 300 for evaluating effectiveness of a remediation operation in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 300 may be provided by instructions executed by a computer of the web service platform 134. The operations of the method 300 may be performed as part of the analysis of block 210 of the method 200.

In block 302, the remediation auditor 106 compares the post-remediation metrics to the pre-remediation metrics. The pre-remediation metrics may the metrics collected in block 202 of FIG. 2 and analyzed to identify the impairment in block 204 of FIG. 2. The post-remediation metrics may be the metrics collected in block 208 of FIG. 2. Suitable post-remediation metrics may be collected under conditions and/or at times that would produce operational conditions similar to those present when the pre-remediation metrics were collected. For example, if the pre-remediation metrics were collected under high network traffic conditions, then the post-remediation metrics may also be collected under high traffic conditions to ensure similar operational constraints. The pre-remediation metrics are compared to the post-remediation metrics. For example, an amount of difference in rate of errors recorded in pre-remediation metrics and in the post-remediation metrics is determined.

In block 304, the remediation auditor 106 determines whether the post-remediation metrics are sufficiently improved relative to the pre-remediation metrics. For example, the post-remediation metrics may be deemed sufficiently improved if the post-remediation metrics indicate that fewer than a predetermined number of errors were recorded by the device during the time period during which the post-remediation metrics were collected. For example, the predetermined number of errors may be a percentage of number of errors recorded by the device when the device was deemed to be impaired. Thus, if, after remediation, the device records only 50%, 60%, 70%, etc. of the number of errors recorded by the device when the device was deemed to be impaired, then the remediation metrics may be deemed sufficiently improved. In some embodiments, the post-remediation metrics may be deemed sufficiently improved if the post-remediation metrics indicate that the number of errors recorded during the time period of post-remediation metrics collection is less than the number of errors recorded during the time period of pre-remediation metrics collection by a predetermined amount.

If the post-remediation metrics are determined to be sufficiently improved in block 304, then in block 308, the remediation operation is judged to be effective to mitigate or correct the impairment. Otherwise, in block 306, the remediation operation is judged to be ineffective to mitigate or correct the impairment.

Figure 4:
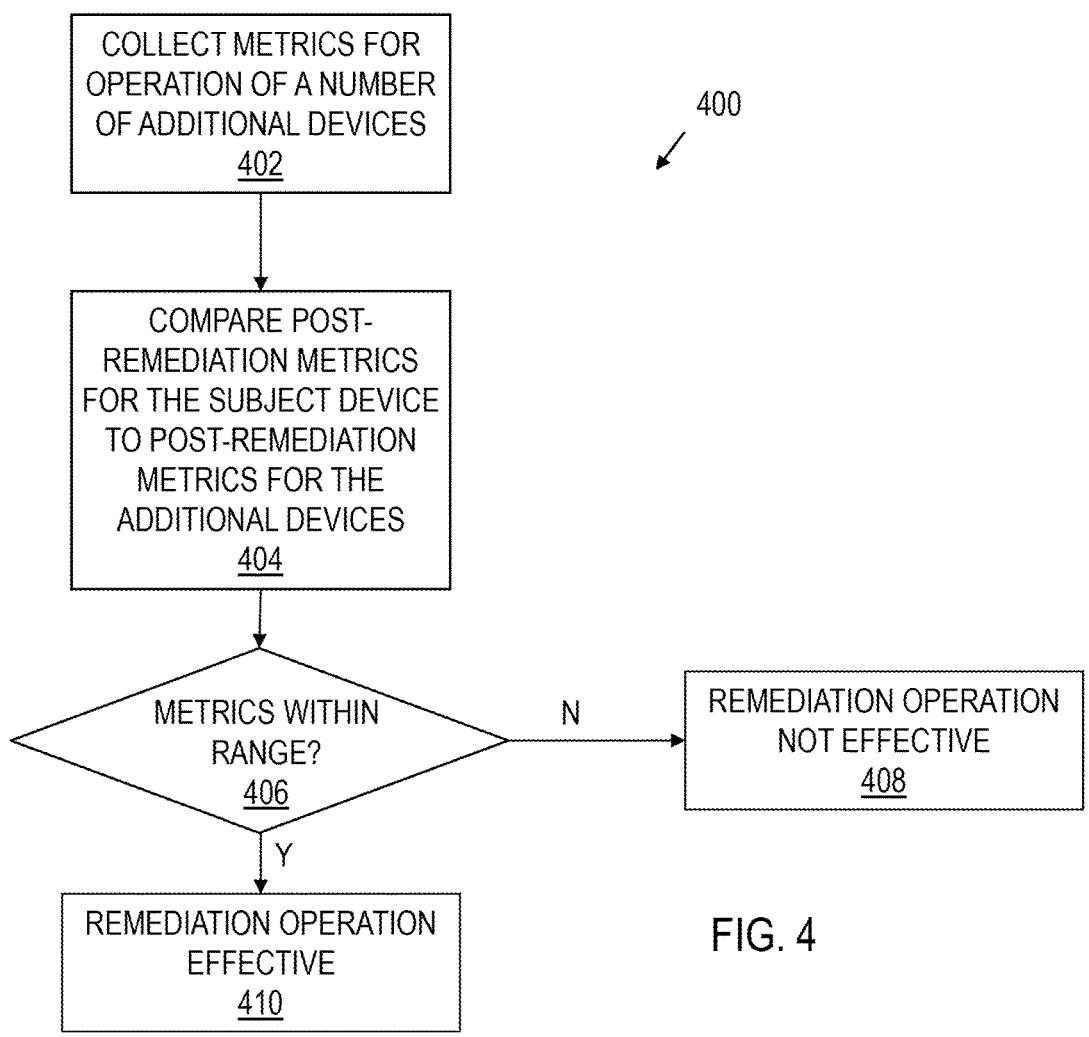
FIG. 4 shows a flow diagram for a method for evaluating effectiveness of a remediation operation in accordance with various examples.

FIG. 4 shows a flow diagram for a method 400 for evaluating effectiveness of a remediation operation in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 400 may be provided by instructions executed by a computer of the web service platform 134. The operations of the method 400 may be performed as part of the analysis of block 210 of the method 200.

In block 402, the remediation service 104 collects metrics for operation of a number of additional instances of the device operating in the web services platform 134. At least some of the additional devices for which metrics are collected may be unimpaired. For example, if the impaired device is a load balancer node 142, then the remediation service 104 may collect metrics for all load balancer nodes 142 operating in the web services platform 134. In other embodiments the remediation services 104 may collect metrics for all other load balancer nodes 142, that in conjunction with the impaired load balancer node 142, form the load balancer 124 or other virtual component.

In block 404, the remediation auditor 106 compares the post-remediation metrics collected for the replacement device to the post-remediation metrics collected for the additional devices. The comparison determines whether the post-remediation metrics are within an acceptable range of the metrics collected for the additional devices. For example, the remediation auditor 106 may compute the average number of errors (or average error rate) reported by the additional devices during a collection interval, and determine whether the number of errors (or error rate) reported by the replacement device during the collection interval is within a predetermined range of the average value. The predetermined range may be defined as a number of standard deviations (1, 1.5, 2, etc.) of the number of errors (or error rate) of the additional devices.

If, in block 406, metrics of the replacement device are within the predetermined range of the metrics of the additional devices, then, in block 410, the remediation operation is judged to be effective to mitigate or correct the impairment. Otherwise, in block 408, the remediation operation is judged to be ineffective to mitigate or correct the impairment.

The operations of the method 400 may be applied in lieu of or in addition to the operations of the method 300 to evaluate the effectiveness of a remediation operation. For example, the remediation service 104 may deem a remediation successful only if both the method 300 of the method 400 find the remediation operation to be effective.

FIG. 5 shows a flow diagram for a method 500 for tuning the remediation service 104 in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 500 may be provided by instructions executed by a computer of the web service platform 134. The operations of the method 500 may be performed as part of the tuning of block 212 of the method 200.

If, in block 502, the remediation operation executed by the remediation service 104 is found to be effective to mitigate or correct the impairment identified by the remediation service 104, then, in block 506, the remediation auditor 106 tunes the remediation service 104 to perform the remediation operation more frequently. For example, if a variety of different remediation operations are available to the remediation service 104, then the remediation auditor 106 may cause a priority value associated with the remediation operation found to be effective to increase. Increasing the priority value may increase the precedence of the remediation operation with respect to other available remediation operations, thereby increasing the frequency with which the remediation operation is performed if the remediation service 104 selects a remediation operation to perform based on the priority values assigned to the available remediation operations.

On the other hand, if, in block 502, the remediation operation executed by the remediation service 104 is found to be ineffective for mitigating or correcting the impairment identified by the remediation service 104, then, in block 504, the remediation auditor 106 tunes the remediation service 104 to perform the remediation operation less frequently. In keeping with the example provided above, if the remediation operation is found to be ineffective, then a priority value assigned to the remediation operation may be reduced, thereby causing the remediation operation to be performed less frequently.

FIG. 6 shows a flow diagram for a method for tuning a remediation in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 600 may be provided by instructions executed by a computer of the web service platform 134. The operations of the method 600 may be performed as part of the tuning of block 212 of the method 200.

If, in block 602, the remediation operation executed by the remediation service 104 is found to be effective to mitigate or correct the impairment identified by the remediation service 104, then, in block 606, the remediation auditor 106 tunes the remediation service 104 to perform the remediation operation more frequently. For example, if a variety of different remediation operations are available to the remediation service 104, then the remediation auditor 106 may cause a priority value associated with the remediation operation found to be effective to increase (as explained in block 506 of FIG. 5).

On the other hand, if, in block 602, the remediation operation executed by the remediation service 104 is found to be ineffective for mitigating or correcting the impairment identified by the remediation service 104, then, in block 604, the remediation auditor 106 tunes the remediation service 104 to perform a different remediation operation to correct the impairment. For example, if a first remediation operation includes replacing an impaired instance of device with a new instance of a first type (e.g., the same type as the impaired instance), and the remediation arbiter 106, determines that the first remediation operation is ineffective for mitigating or correcting the impairment, then the remediation arbiter 106 may cause the remediation service 104 to execute a second remediation operation to correct future occurrences of the impairment, where the second remediation operation replaces an impaired instance of the device with a new instance of a second type (e.g., a different type than the impaired instance). The remediation service 104 may select the second remediation operation from any number of available remediation operations. For example, the remediation service 104 may select the second remediation operation at random from the available remediation operations or select the second remediation operation based on a priority value assigned to each available remediation operation.

FIG. 7 shows a flow diagram for a method for tuning a remediation in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 700 may be provided by instructions executed by a computer of the web service platform 134. The operations of the method 700 may be performed as part of the tuning of block 212 of the method 200.

If, in block 702, the remediation operation executed by the remediation service 104 is found to be effective to mitigate or correct the impairment identified by the remediation service 104, then, in block 706, the remediation auditor 106 lowers a threshold for identifying a device as impaired. For example, the remediation arbiter 106 may reduce a value of error rate over time that identifies a device as being impaired. In turn, the number of devices identified as being impaired may increase, and the remediation operation deemed successful may be applied to improve the performance of the impaired devices.

On the other hand, if, in block 702, the remediation operation executed by the remediation service 104 is found to be ineffective for mitigating or correcting the impairment identified by the remediation service 104, then, in block 704, the remediation auditor 106 raises the threshold for identifying a device as impaired. For example, the remediation arbiter 106 may increase a value of error rate over time that identifies a device as impaired. In turn, the number of devices identified as being impaired may decrease, and the remediation operation deemed unsuccessful may be applied less often than often than previously.

Figure 8:
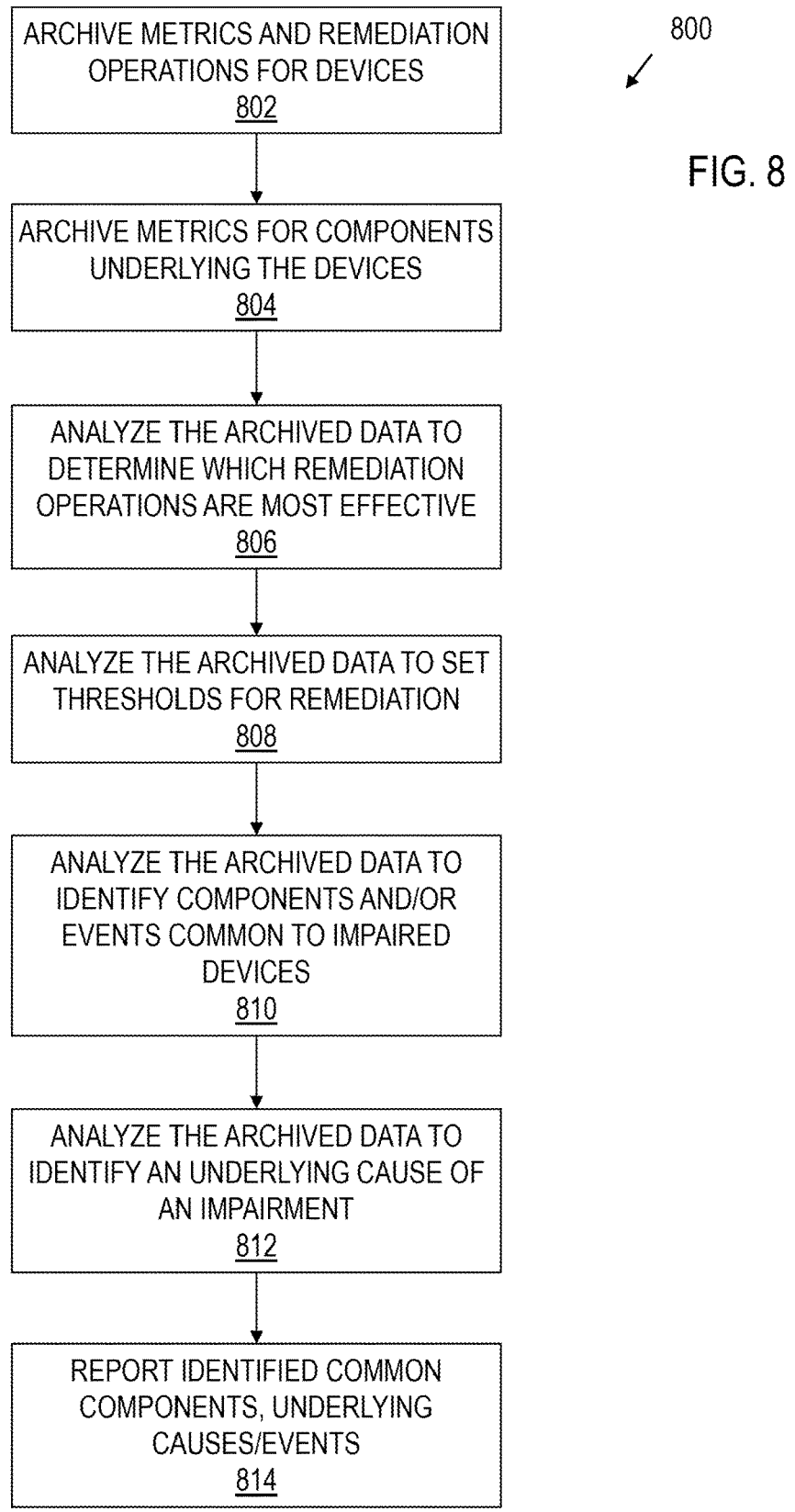
FIG. 8 shows a flow diagram for a method for processing metrics for tuning remediation in accordance with various examples.

FIG. 8 shows a flow diagram for a method 800 for processing metrics for tuning remediation in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 800 may be provided by instructions executed by a computer of the web service platform 134.

In block 802, the remediation service 104 collects metrics for the operation of various components of the web services platform 134. For example, the remediation service 104 records metrics for operation of the load balancer 124 and the virtual machines 122A as described herein.

In block 804, the web services platform 134 records, in the log 108, metrics for performance of the computing hardware, virtual systems, etc. underlying the virtual machines 122A. Examples of such metrics may include errors detected in computing hardware or abrupt changes in loading of hardware systems. The web services platform 134 may also record, in the log 108, information pertaining to various events in the web services platform 134 that may affect the operation of the load balancer 124 and/or the virtual machines 122A. Examples of such events include updating of software underlying the virtual machines 122A, and changing in configuration of the load balancer 124 (e.g., customer initiated feature activation or deactivation). In some embodiments of the web services platform 134, the various metrics and events referred to herein may be archived in multiple logs, and the log 108 may include the multiple logs.

In block 806, the remediation auditor 106 analyzes the data stored in the log 108 to determine which of the remediation operations performed by the remediation service 104 are most effective. For example, the remediation auditor 106 may calculate a degree of effectiveness for each remediation operation as a function of the amount of change in performance of a device after the remediation operation is performed. A change in performance may be measured based on difference in pre-mediation and post-mediation metrics. For example, post-remediation metrics for the device may be compared to pre-remediation metrics for the device. Alternatively, a difference in pre-remediation metrics of the impaired device and pre-remediation metrics of other devices may be compared to a difference of post-remediation metrics of the remediated device and the other devices.

In block 808, the remediation auditor 106 analyzes the data stored in the log 108 to determine thresholds for identifying a device as being impaired. The remediation auditor 106 sets the thresholds applied by the remediation service 104 to adjust the number of devices remediated. By raising the threshold, devices with error rates, or other metrics, that would have been deemed impaired had the threshold not been raised, will not be remediated. Similarly, by lowering the threshold, devices with error rates, or other metrics, that would not have been deemed impaired had the threshold not been lowered, will not be remediated. The remediation auditor 106 may adjust the threshold as a function of the effectiveness of remediation operations recorded in the log 108 over time. For example, if a remediation operation is more effective than not (e.g., the remediation operation generally results in improved performance), then the threshold for identifying impairment may be decreased, and the rate of remediation increased. Conversely, if a remediation operation is more often ineffective than effective, then the threshold for identifying impairment may be increased, and the rate of remediation decreased.

In block 810, the remediation auditor 106 analyzes the data stored in the log 108 to identify components and/or events that are common to impaired devices. For example, if a particular type of hardware platform is used in a high percentage of devices identified as impaired, while a different type of hardware platform is used in devices that are generally not identified as impaired, then the remediation auditor 106 may identify the particular type of hardware platform used in the high percentage of devices identified as impaired as being a potential cause of the impairment. Similarly, the remediation auditor 106 may identify software components that are common to devices deemed impaired.

In block 812, the remediation auditor 106 analyzes the data stored in the log 108 to identify an underlying cause of an impairment. In some embodiments, a hardware or software component found to be common to impaired devices may be identified as a potential underlying cause of the impairment. The remediation auditor 106 also analyzes events, such as software updates and configuration changes, recorded in the log 108 with respect to identification of an impairment. If an event correlates in time to the appearance of an impairment, then the remediation auditor 106 may identify the event as a potential underlying cause of the impairment. For example, if the events and metrics recorded in the log 108 are time stamped, and the time stamp of an event relevant to performance of an impaired device (e.g., a software update) indicates that the event occurred within a predetermined time of when the impairment was identified, then the remediation auditor 106 may identify the event as a potential underlying cause of the impairment.

In block 814, the remediation auditor 806 reports identified common components and underlying causes to authorities for further investigation. For example, the remediation auditor 106 may generate a report directed to a hardware engineering team if a hardware component is identified as a potential underlying cause of an impairment. The report may identify the component, the rate of occurrence of the component in devices identified as impaired, and the values of metrics that identify the device as impaired.

Figure 9:
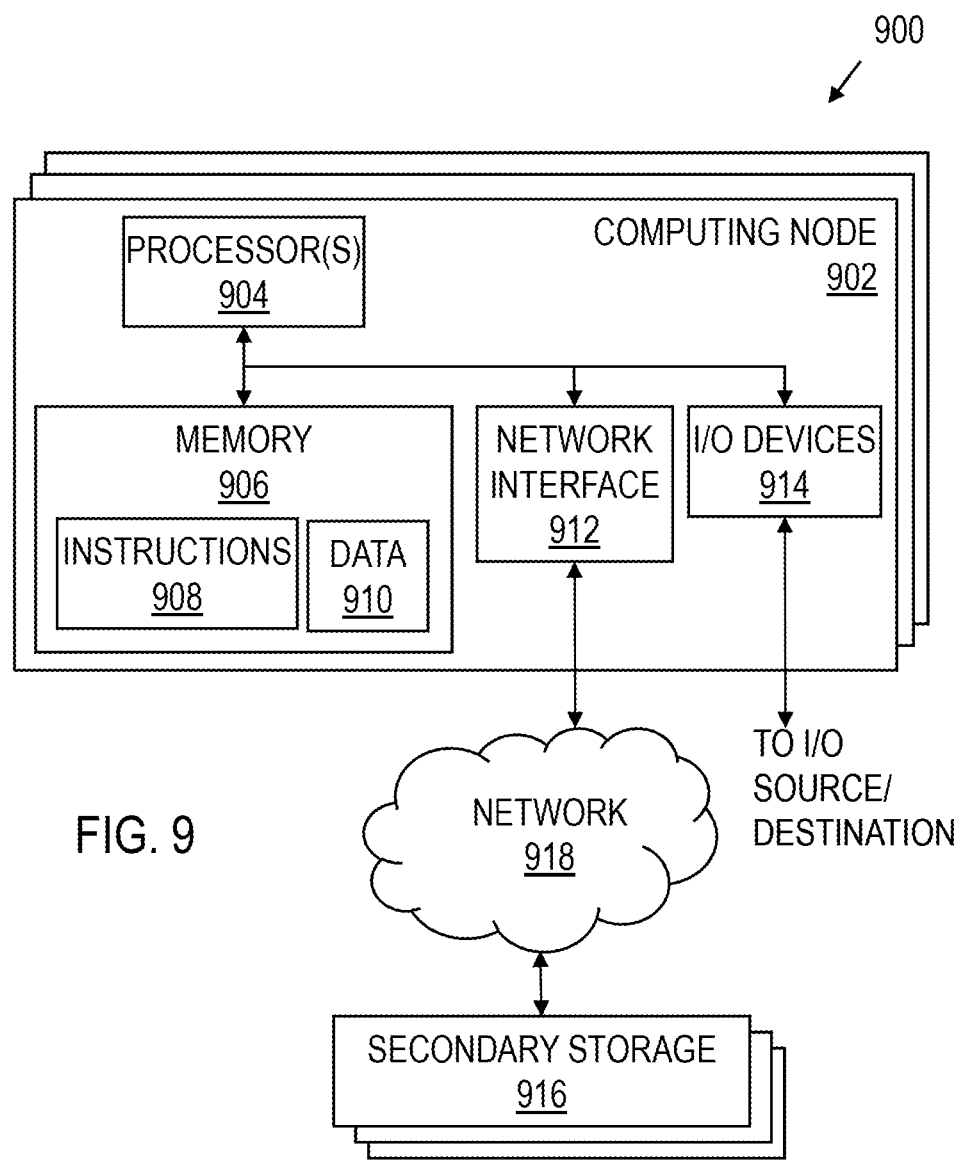
FIG. 9 shows a schematic diagram for a computing system suitable for implementation of auditing and tuning of remediation in accordance with various embodiments.

FIG. 9 shows a schematic diagram for a computing system 900 suitable for implementation of auditing and tuning of remediation in accordance with various embodiments. The computing system 900 includes one or more computing nodes 902 and secondary storage 916 that are communicatively coupled via a network 918. One or more of the computing nodes 902 and associated secondary storage 916 may be applied to provide the functionality of the web services platform 134, including the load balancer 124, the management service 102, the remediation service 104, the remediation auditor 106, the workflow server 110, the API server 114, the data store 116, the event queue 112, the application 126, etc.

Each computing node 902 includes one or more processors 904 coupled to memory 906, network interface 912, and I/O devices 914. In some embodiments of the system 100, a computing node 902 may implement the functionality of more than one component of the system 100. In various embodiments, a computing node 902 may be a uniprocessor system including one processor 904, or a multiprocessor system including several processors 904 (e.g., two, four, eight, or another suitable number). Processors 904 may be any suitable processor capable of executing instructions. For example, in various embodiments, processors 904 may be general-purpose or embedded microprocessors implementing any of a variety of instruction set architectures (ISAs), such as the x86, PowerPC, SPARC, or MIPS ISAs, or any other suitable ISA. In multiprocessor systems, each of processors 904 may commonly, but not necessarily, implement the same ISA. Similarly, in a distributed computing system such as one that collectively implements the web services platform 134, each of the computing nodes 902 may implement the same ISA, or individual computing nodes and/or replica groups of nodes may implement different ISAs.

The memory 906 may include a non-transitory, computer-readable storage medium configured to store program instructions 908 and/or data 910 accessible by processor(s) 904. The system memory 906 may be implemented using any suitable memory technology, such as static random access memory (SRAM), synchronous dynamic RAM (SDRAM), nonvolatile/Flash-type memory, or any other type of memory. Program instructions 908 and data 910 implementing the functionality disclosed herein are stored within system memory 906. For example, instructions 908 may include instructions that when executed by processor(s) 904 implement the load balancer 124, the management service 102, the remediation service 104, the remediation auditor 106, the workflow server 110, the API server 114, the data store 116, the event queue 112, and/or other components of the web services platform 134 disclosed herein.

Secondary storage 916 may include volatile or nonvolatile storage and storage devices for storing information such as program instructions and/or data as described herein for implementing the web services platform 134. The secondary storage 916 may include various types of computer-readable media accessible by the computing nodes 902 via the network 918. A computer-readable medium may include storage media or memory media such as semiconductor storage, magnetic or optical media, e.g., disk or CD/DVD-ROM, or other storage technologies. Program instructions and data stored on the secondary storage 916 may be transmitted to a computing node 902 for execution by a processor 904 by transmission media or signals via the network 918, which may be a wired or wireless network or a combination thereof.

The network interface 912 may be configured to allow data to be exchanged between computing nodes 902 and/or other devices coupled to the network 918 (such as other computer systems, communication devices, input/output devices, or external storage devices). The network interface 912 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 914 may include one or more display terminals, keyboards, keypads, touchpads, scanning devices, voice or optical recognition devices, or any other devices suitable for entering or retrieving data by one or more computing nodes 902. Multiple input/output devices 914 may be present in a computing node 902 or may be distributed on various computing nodes 902 of the system 900. In some embodiments, similar input/output devices may be separate from computing node 902 and may interact with one or more computing nodes 902 of the system 100 through a wired or wireless connection, such as over network interface 912.

Those skilled in the art will appreciate that computing system 900 is merely illustrative and is not intended to limit the scope of embodiments. In particular, the computing system 900 may include any combination of hardware or software that can perform the functions disclosed herein, including computers, network devices, internet appliances, PDAs, wireless phones, pagers, etc. Computing node 902 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of a method may be changed, and various elements may be added, reordered, combined, omitted, modified, etc., in various embodiments.

Certain terms are used throughout the foregoing description and the following claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be based on Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
 a plurality of computing nodes, each of the computing nodes comprising a processor and memory coupled to the processor, wherein the computing nodes are configured to:
  implement a plurality of computing devices in a web services platform;
  identify an impairment in operation of a first of the computing devices;
  execute a first remediation operation to mitigate the impairment;
  analyze operation of the first of the computing devices after execution of the first remediation operation to determine whether the first remediation operation is effective to mitigate the impairment;
  deem the first remediation operation effective to mitigate the impairment based on an average error rate of the first of the computing devices after execution of the first remediation operation being within a predetermined range of an average error rate of others of the computing devices; and
  change a frequency with which the first remediation operation is applied to mitigate the impairment based on whether the first remediation operation is deemed effective to mitigate the impairment.

2. The system of claim 1, wherein the computing nodes are configured to:
 collect first metrics indicative of health of the first of the computing devices;
 identify the impairment based on the first metrics;
 collect second metrics that are indicative of health of the first of the computing devices after execution of the first remediation operation;

evaluate effectiveness of the first remediation operation based on the second metrics.

3. The system of claim 2, wherein the computing nodes are configured to compare the first metrics to the second metrics to determine whether the first remediation operation mitigated the impairment.

4. The system of claim 2, wherein the computing nodes are configured to:
collect third metrics indicative of health of the computing devices after execution of the first remediation operation; and
compare the second metrics and the third metrics to determine whether the first remediation operation mitigated the impairment.

5. The system of claim 2, wherein the computing nodes are configured to, based on the first remediation operation not being deemed effective to mitigate the impairment, apply a second remediation operation to mitigate the impairment in operation of a second of the computing devices.

6. The system of claim 2, wherein the computing nodes are configured to, based on the first remediation operation being deemed effective to mitigate the impairment, apply the first remediation operation to mitigate the impairment more frequently than the first remediation operation was applied prior to identification of the impairment in operation of the first of the computing devices.

7. The system of claim 2, wherein the first metrics comprise an average error rate of the first of the computing devices prior to execution of the first remediation operation, and the second metrics comprise an average error rate of the first of the computing devices after execution of the first remediation operation.

8. The system of claim 2, wherein the computing nodes are configured to:
set a threshold that identifies a value of the first metrics that triggers execution of the first remediation operation;
adjust the threshold based on whether the first remediation operation is deemed effective to mitigate the impairment.

9. The system of claim 1, wherein the computing nodes are configured to:
record impairments identified in the computing devices and results of remediation operations executed to mitigate the impairments over time;
analyze the recorded results of remediation operations to identify the remediation operation most effective at mitigating each of the impairments.

10. The system of claim 9, wherein the computing nodes are configured to analyze the recorded results to identify an underlying component common to a given one of the impairments, and underlying component revision common to the given one of the impairments, or an underlying component configuration common to the given one of the impairments.

11. The system of claim 9, wherein the computing nodes are configured to analyze errors reported in components underlying the computing devices to identify an underlying cause of a given one of the impairments.

12. A method for mitigating operational impairment of a computer system, comprising:
identifying an impairment in operation of a first of a plurality of computing devices implemented by the computing system;
executing a first remediation operation to mitigate the impairment;
analyzing operation of the first of the computing devices after execution of the first remediation operation to determine whether the first remediation operation is effective to mitigate the impairment in the first of the computing devices;
reducing a frequency with which the first remediation operation is applied to mitigate the impairment in others of the computing devices based on the first remediation operation being deemed not effective in mitigating the impairment in the first of the computing devices; and
deeming the first remediation operation effective to mitigate the first impairment based on an average error rate of the first of the computing devices after execution of the first remediation operation being within a predetermined range of an average error rate of others of the computing devices.

13. The method of claim 12, further comprising increasing the frequency with which the first remediation operation is applied to mitigate the impairment in others of the computing devices based on the first remediation operation being deemed effective in mitigating the impairment in the first of the computing devices.

14. The method of claim 12, further comprising executing a different remediation operation to mitigate the impairment in others of the computing devices based on the first remediation operation being deemed not effective in mitigating the impairment in the first of the computing devices.

15. The method of claim 12, further comprising:
collecting first metrics indicative of health of the first of the computing devices;
identifying the first impairment based on the first metrics;
collecting second metrics that are indicative of health of the first of the computing devices after execution of the first remediation operation;
collecting third metrics that are indicative of health of the computing devices after execution of the first remediation operation;
comparing the second metrics to the first metrics or to the third metrics to determine whether the first remediation operation mitigated the first impairment.

16. The method of claim 15, further comprising:
setting a threshold that identifies a value of the first metrics that triggers execution of the first remediation operation;
adjusting the threshold based on whether the first remediation operation is deemed effective to mitigate the first impairment.

17. The method of claim 12, further comprising:
archiving impairments identified in the computing devices and results of remediation operations executed to mitigate the impairments over time;
analyzing the recorded results of remediation operations to identify the remediation operation most effective at mitigating each of the impairments; and
analyzing the recorded results to identify an underlying component common to a given one of the impairments, and underlying component revision common to the given one of the impairments, or an underlying component configuration common to the given one of the impairments.

18. The method of claim 12 further comprising:
measuring loading of the first of the computing devices in conjunction with the identifying; and wherein the analyzing comprising tracking effectiveness of the first remediation operation with respect to the measured loading.

\* \* \* \* \*